(12) United States Patent
Azmandian et al.

(10) Patent No.: US 10,019,195 B1
(45) Date of Patent: Jul. 10, 2018

(54) STORAGE ARRAY HEALTH SCORE

(71) Applicant: EMC Corporation, Hopkinton, MA (US)

(72) Inventors: Fatemeh Azmandian, Raynham, MA (US); Ron Arnan, Nes Ziona (IL); Amnon Naamad, Brookline, MA (US); David Moloney, Carrigaline (IE)

(73) Assignee: EMC IP HOLDINGS COMPANY LLC, Hopkinton, MA (US)

( * ) Notice: Subject to any disclaimer, the term of this patent is extended or adjusted under 35 U.S.C. 154(b) by 39 days.

(21) Appl. No.: 15/193,611

(22) Filed: Jun. 27, 2016

(51) Int. Cl.
*G06F 3/06* (2006.01)

(52) U.S. Cl.
CPC .......... *G06F 3/0653* (2013.01); *G06F 3/0604* (2013.01); *G06F 3/067* (2013.01)

(58) Field of Classification Search
CPC ............... G06F 3/0653; G06F 11/3409; G06F 3/06–3/069; G06F 11/00–11/2097; G06F 12/00–12/16
See application file for complete search history.

(56) References Cited

U.S. PATENT DOCUMENTS

| | | | |
|---|---|---|---|
| 2011/0265064 A1* | 10/2011 | Hadar | G06F 17/30985 717/121 |
| 2015/0082432 A1* | 3/2015 | Eaton | H04L 47/785 726/23 |
| 2016/0306675 A1* | 10/2016 | Wiggers | G06F 9/5077 |

* cited by examiner

*Primary Examiner* — Nicholas Simonetti
(74) *Attorney, Agent, or Firm* — Anderson Gorecki LLP

(57) ABSTRACT

For each storage array in a storage system, a single value score indicative of the overall health of the respective storage array is calculated. Storage array health score may be tracked over time and used to identify storage arrays in need of maintenance. The storage array health score may be calculated as a composite of four component scores: physical component health, logical component health, Service Level Objective compliance and Best Practice Configuration Compliance. The physical component and logical component scores may be based on multiple different category health scores, and each category health score may be based on multiple instance health scores. Health scores may be used to identify remedial actions and predict health score increase as a result of remedial actions.

20 Claims, 7 Drawing Sheets

STORAGE ARRAY HEALTH SCORE

BACKGROUND

The subject matter of this disclosure is generally related to data storage systems that may be used to maintain large data sets and support multiple host applications and concurrent users. A data storage system may include one or more storage arrays. Each of the storage arrays may include multiple computing nodes that manage access to multiple tangible data storage devices in order to provide storage services. For example, the storage arrays may present one or more logical production volumes of storage to the host applications. The host applications may access the production volumes by generating IO (input/output) requests. The computing nodes maintain an abstraction layer between the production volumes and the tangible data storage devices such that an IO request directed to a production volume is serviced by accessing the tangible data storage devices.

SUMMARY

All examples, aspects and features mentioned in this document can be combined in any technically possible way.

In accordance with an aspect an apparatus comprises: a data storage system comprising a plurality of storage arrays, each storage array comprising a plurality of tangible data storage devices and a plurality of computing nodes, each computing node comprising at least one processor and a cache, wherein the computing nodes present at least one production volume to a host application, the production volume being backed by the tangible data storage devices; and program code stored on a non-transitory computer-readable memory, the program code comprising instructions that calculate a single value health score for each of the storage arrays. In some implementations the apparatus comprises instructions that calculate each storage array health score as a function of a physical component score and a logical component score. In some implementations the apparatus comprises instructions that calculate the physical component score as a function of a plurality of physical component category scores. In some implementations the apparatus comprises instructions that calculate the logical component score as a function of a plurality of logical component category scores. In some implementations the apparatus comprises instructions that calculate each physical component category score as a function of a plurality of physical component category instance scores. In some implementations the apparatus comprises instructions that calculate each logical component category score as a function of a plurality of logical component category instance scores. In some implementations the apparatus comprises records of performance indicators in a plurality of physical component categories selected from storage engines, computing nodes, front end ports, front end directors, back end ports, back end directors, channel adapters, channel adapter ports, cache, cache partitions, tangible data storage devices, boards, and board-level subsystems. In some implementations the apparatus comprises records of performance indicators in a logical component category selected from storage groups and host applications. In some implementations the apparatus comprises the instructions further utilizing a service level obligation compliance component score to calculate each storage array health score. In some implementations the apparatus comprises the instructions further utilizing a best practices compliance component score to calculate each storage array health score.

In accordance with an aspect a method comprises: with a data storage system comprising a plurality of storage arrays, each storage array comprising a plurality of tangible data storage devices and a plurality of computing nodes, each computing node comprising at least one processor and a cache: presenting at least one production volume to a host application, the production volume being backed by the tangible data storage devices; and calculating a single value health score for each of the storage arrays. In some implementations the method comprises calculating each storage array health score as a function of a physical component score and a logical component score. In some implementations the method comprises calculating the physical component score as a function of a plurality of physical component category scores. In some implementations the method comprises calculating the logical component score as a function of a plurality of logical component category scores. In some implementations the method comprises calculating each physical component category score as a function of a plurality of physical component category instance scores. In some implementations the method comprises calculating each logical component category score as a function of a plurality of logical component category instance scores. In some implementations the method comprises calculating physical component instance scores based on records of performance indicators in a plurality of physical component categories selected from storage engines, computing nodes, front end ports, front end directors, back end ports, back end directors, channel adapters, channel adapter ports, cache, cache partitions, tangible data storage devices, boards, and board-level subsystems. In some implementations the method comprises calculating logical component instance scores based on records of performance indicators in a logical component category selected from storage groups and host applications. In some implementations the method comprises utilizing a service level obligation compliance component score to calculate each storage array health score. In some implementations the method comprises utilizing a best practices compliance component score to calculate each storage array health score.

DETAILED DESCRIPTION

Some aspects, features and implementations described herein may include computer devices, components and computer-implemented steps or processes. It will be apparent to those of ordinary skill in the art that the computer-implemented steps or processes may be stored as computer-executable instructions on a non-transitory computer-readable medium. Furthermore, it will be understood by those of ordinary skill in the art that the computer-executable instructions may be executed on a variety of tangible processor devices. For ease of exposition, not every step, process or element is necessarily described herein as part of a computer system. Those of ordinary skill in the art will recognize steps, processes and elements that may have a corresponding computer system or software component. Such computer system and software components are therefore enabled by describing their corresponding steps, processes or elements, and are within the scope of the disclosure.

The terminology used in this description is intended to be interpreted broadly within the limits of subject matter eligibility. The terms "logical" and "virtual" are used to refer to features that are abstractions of other features or tangible devices. For example, multiple virtual computing devices could operate simultaneously on one tangible computing device. The term "physical" is used to refer to tangible features. A "host application" is a computer program that accesses a storage service. A "production volume" is a logical unit of storage that is presented to the host application. Tangible data storage devices are used to implement the storage service and present the production volume.

Figure 1:
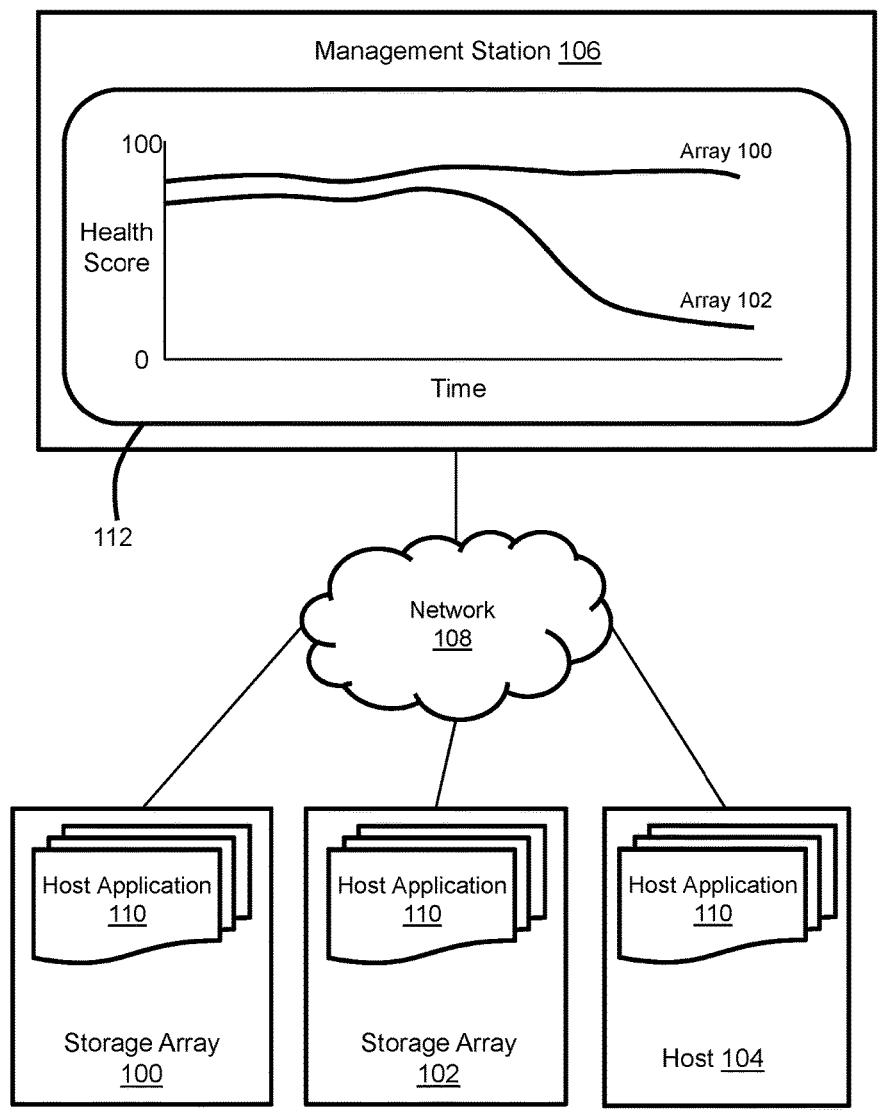
FIG. 1 illustrates storage array health scores indicative of the overall health of individual storage arrays over time.

FIG. 1 illustrates an exemplary data storage system that includes multiple data storage arrays 100, 102, an external host 104, and a management station 106. The storage arrays, external host and management station are interconnected by a network 108. The network 108 may include various types of network devices, e.g. switches and routers, and may include one or more of the Internet, a WAN (wide area network), MAN (metropolitan area network), LAN (local area network), and SAN (Storage Area Network). The external host 104 may be a tangible server computer with volatile memory, persistent storage and multi-core processors, or a virtual host associated with a virtual machine or container running on such a tangible server computer. The host 104 supports operation of instances of a host application 110 that utilizes the storage services provided by the storage arrays 100, 102. Instances of host applications 110 may also or alternatively be run directly on the storage arrays on virtual internal hosts. Examples of host applications include but are not limited to a database, file server and block server.

The management station 106 may include a tangible computing device that runs storage system management software that is stored on non-transitory memory and operated by a tangible processor. For example, the management station software may include a dashboard interface 112 that indicates a separate health score for each of the storage arrays 100, 102. It should be understood that the storage system could include more than two storage arrays, and the health scores for more than two storage arrays could be presented on the dashboard interface. In the illustrated example the health score is a single alpha numerical value that indicates, relative to predetermined maximum and minimum values, the overall health of the storage array being scored. For example and without limitation, the health score could be an integer value between 0 and 100, where the value 0 is indicative of poorest health and the value 100 is indicative of best health. The health scores of a storage array may be tracked and presented graphically as a series of health score values versus time so that changes in storage array health may be easily observed via the dashboard interface. Because the health score is represented as a single value an operator may quickly and easily assess the health of the storage system based on the health scores of the multiple storage arrays. For example, presentation of the health scores of multiple storage arrays over time on a single screen may convey the health of the storage system and enable localization of degradation in system performance to a particular storage array. More particularly, storage arrays presented on the dashboard interface 112 as having a health score consistently near 100 may be quickly evaluated as not being in need of attention, whereas a storage array for which the health score is decreasing over time may be quickly evaluated as being in need of attention such as performance degradation analysis. As will be explained in greater detail below, the storage array health score may be a composite value that conveys overall health of a storage array more succinctly than hundreds of different indicators of health and performance of various subsystems, components and features of the storage array.

Figure 2:
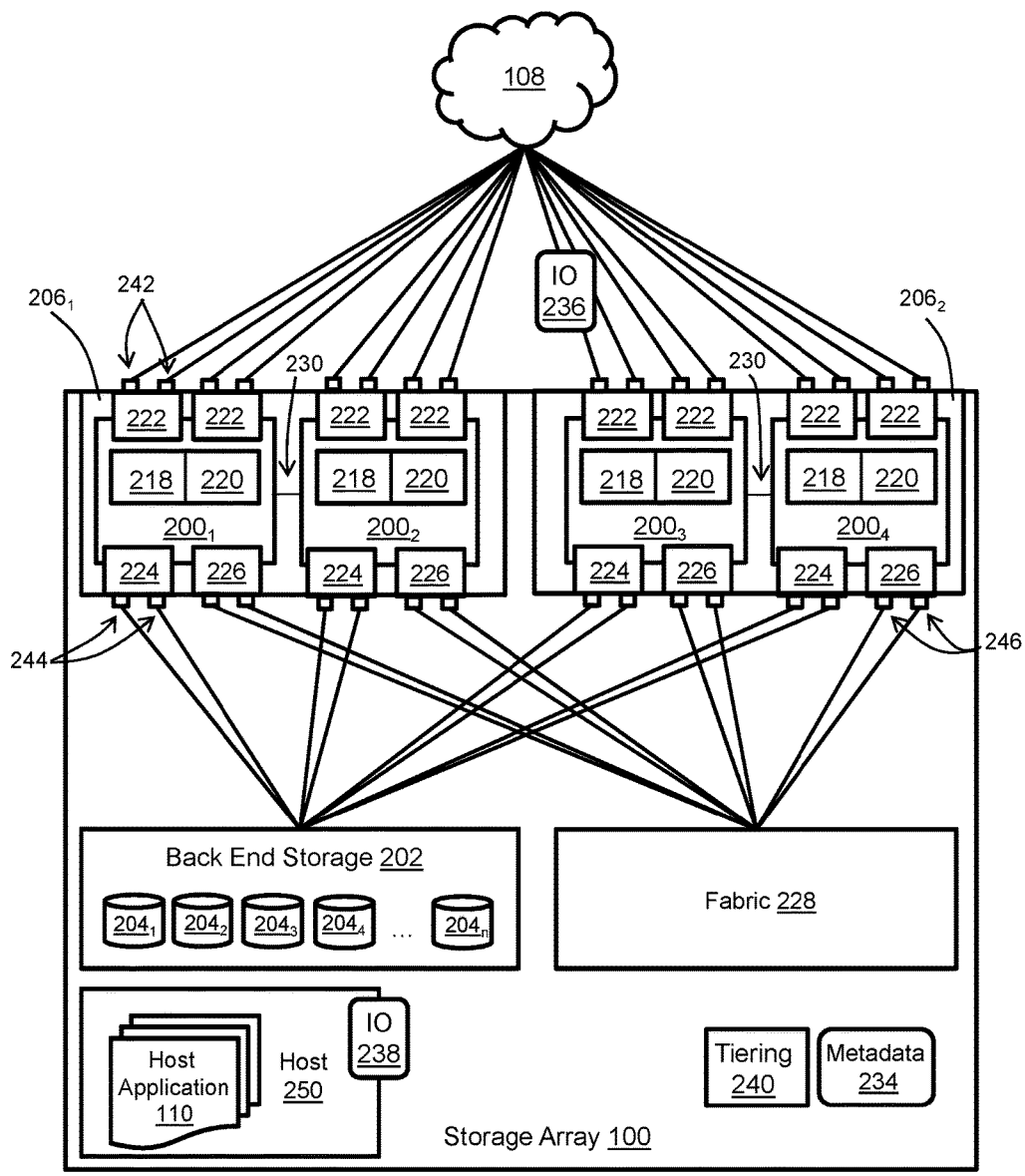
FIG. 2 illustrates a storage array in greater detail.

FIG. 2 illustrates exemplary data storage array 100 in greater detail. The storage array 100 includes back end storage 202 and one or more interconnected computing nodes $200_1$, $200_2$, $200_3$, $200_4$. The back end storage 202 may include a disk controller and multiple tangible data storage devices $204_1$-$204_n$. The tangible data storage devices in back end storage may include devices of various different technology types, for example and without limitation SSDs (solid state drives, aka "flash") and HDDs (hard disk drives). The computing nodes $200_1$-$200_4$ may include "vanilla" storage server computers and/or specialized electronic hardware platforms including but not limited to "storage directors" that are specifically designed for use in storage arrays. Pairs of computing nodes $200_1$, $200_2$ and $200_3$, $200_4$ may be organized as storage engines $206_1$, $206_2$, respectively. Paired computing nodes may be directly interconnected by communication links 230. The paired computing nodes of a storage engine provide failover protection for each other. Each computing node includes at least one tangible multi-core processor 218 and a cache 220. The cache 220 may include, for example and without limitation, volatile memory components such as RAM (random access memory) and non-volatile memory components such as high performance SSDs (solid state devices). Each computing node may allocate a partition of its respective cache 220 to a shared "global" cache that can be accessed by other computing nodes via the communication links 230, 232, e.g. via DMA (direct memory access) or RDMA (remote direct memory access). Each computing node may include one or more FEs (front-end directors, aka front end adapters) 222 for communicating with the host 104 (FIG. 1), cloud storage, other storage arrays and other devices that can be reached via the network 108 (FIG. 1). Each computing node may also include one or more BEs (back end directors, aka back end adapters) 224 for communicating with backend storage 202. Each computing node may also include one or more CAs (channel directors, aka channel adapters) 226 for communicating with other computing nodes via interconnecting fabric 228. Each FE 222 includes two ports 242. Each BE 224 includes two ports 244. Each CA 226 includes two ports 246. The computing nodes $200_1$-$200_4$ and backend storage 202 may be, but are not necessarily, located in the same geographic location and within the same chassis.

Figure 3:
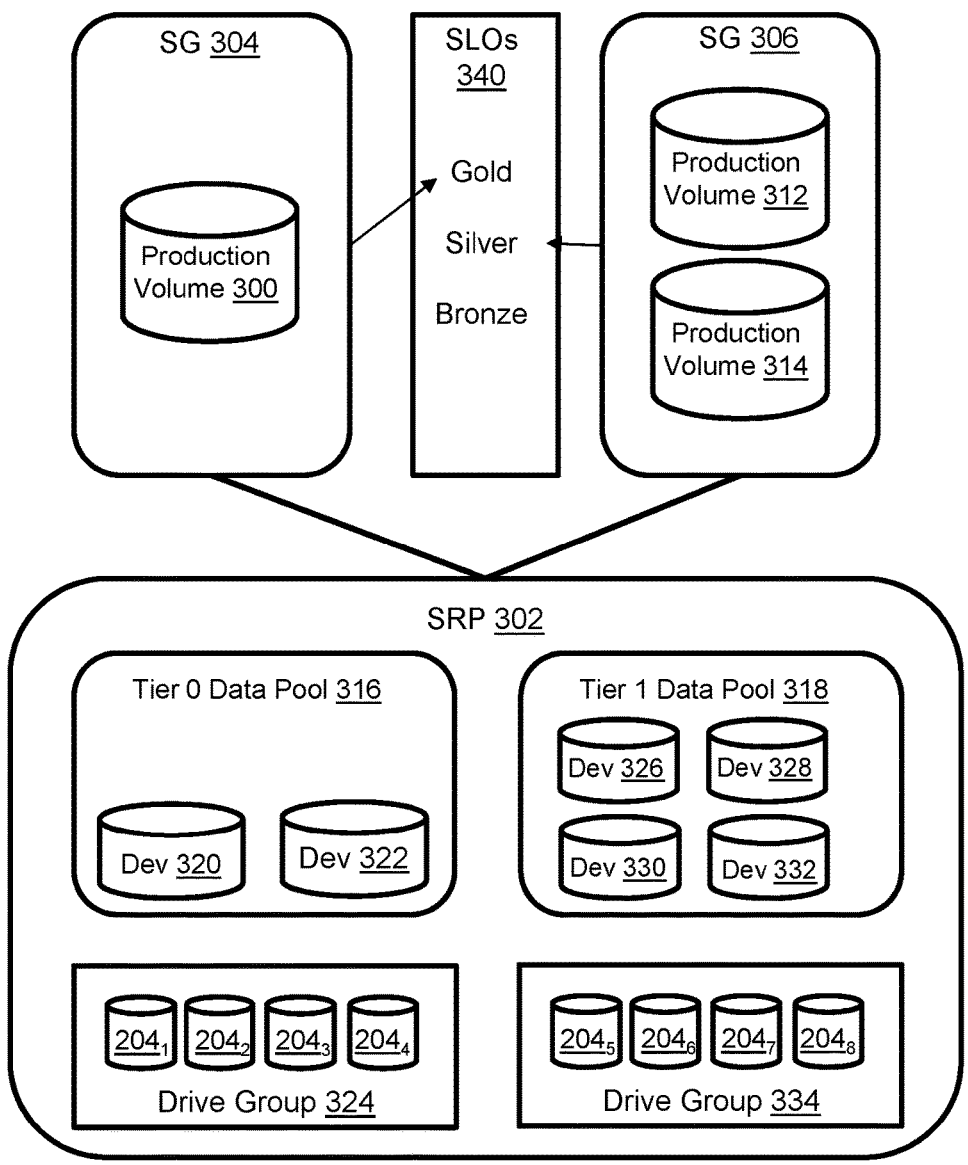
FIG. 3 illustrates organization of the storage resources of a storage array.

Referring now to FIGS. 2 and 3, the computing nodes $200_1$-$200_4$ maintain at least one logical production volume 300 that is backed by tangible data storage devices in back end storage 202. Without limitation, the production volume 300 may be referred to as a production LUN or host LUN, where LUN (logical unit number) is a number used to identify the logical storage volume in accordance with the SCSI (small computer system interface) protocol. The production volume 300, which is presented to instances of the host application 110, represents an abstraction layer between the tangible data storage devices of back end storage 202 and instances of the host application 110. From the perspective of the host application 110, host application data resides on the production volume 300, and the production volume is a single data storage device having a set of contiguous fixed-size LBAs (logical block addresses). However, the host application data may actually be maintained at non-contiguous addresses on various different tangible storage devices in back end storage 202. The storage array 100 maintains metadata 234 indicative of the locations of extents of host application data on the tangible storage devices in storage 202. The computing nodes $200_1$-$200_4$ can use the metadata 234 to determine the actual locations of extents of host application data on the tangible data storage devices $204_1$-$204_n$ based on references to locations on the production volume 300. Such references may be included in IO requests, e.g. in an IO 236 from external host 104 (FIG. 1) and an IO 238 from an internal host 250 that runs on a virtual machine or in a container supported by the storage array 100. In order to service an IO request, the corresponding host application data is temporarily placed in cache 220 while being copied between the host application 110 and back end storage 202. More particularly, data that is being written to storage is temporarily held in cache 220 and then destaged to storage, and data that is being read is temporarily copied from storage to cache and then provided to the host application.

The tangible data storage devices $204_1$-$204_n$ that "back" the production volumes may be organized as a SRP (storage resource pool) 302. Data storage resources of the SRP may be allocated to SGs (storage groups) 304, 306, each of which may include one or more production volumes. In the illustrated example SG 308 includes production volume 300 and SG 310 includes production volumes 312, 314. The SRP 302 includes multiple data pools 316, 318. Each data pool may include multiple logical devices associated with a particular performance class of tangible data storage devices. Different data pools may be associated with different classes of tangible data storage devices. In the illustrated example the tangible data storage devices $204_1$-$204_n$ (FIG. 1) include both SSDs in a tier 0 class and HDDs in a tier 1 class. Data pool 316 is associated only with tier 0 SSDs. Data pool 318 is associated only with tier 1 HDDs. The logical devices of each data pool are backed by a drive group. For example, logical devices 320, 322 of data pool 316 are backed by drive group 324, and logical devices 326, 328, 330, 332 of data pool 318 are backed by drive group 334. Each drive group includes tangible data storage devices of backend storage that share the same performance characteristics, e.g. technology type, rotational speed, and capacity. In the illustrated example tangible storage devices $204_1$, $204_2$, $204_3$ and $204_4$ are SSDs having the same performance characteristics, and tangible storage devices $204_5$, $204_6$, $204_7$ and $204_8$ are HDDs having the same performance characteristics. The tangible storage devices of each drive group are configured as a RAID group, e.g. a RAID-5 (3+1) in the illustrated example although other RAID levels could be used. Each logical device in the data pool may be backed by a slice of the tangible data storage devices of the associated drive group, e.g. as defined by an address range. Each SG is allocated a portion of the storage resources of one or more data pools. For example, SG 304 may include both tier 0 and tier 1 storage resources. The performance of an SG is in part a function of the performance class composition of the SG. For example, an SG with a generous allocation of tier 0 resources from data pool 316 may be higher performing than an SG based on tier 1 resources from data pool 318. An automated storage tiering program 240 may be implemented by the computing nodes in order to leverage higher performing resources in a mix of allocated resources by promoting relatively active data (e.g. recently accessed) to higher performance storage media, e.g. to tier 0 data pool 316, and demoting relatively inactive data (e.g. not recently accessed) to lower performance storage media, e.g. to tier 1 data pool 318. Promotion and demotion of extents of data between data devices and tiers may occur periodically or continuously as activity levels change. Automatic storage tiering may help maintain a target level of performance by maintaining extents of data on activity-appropriate storage resources.

The data pool performance class composition of SGs may be used to help to assure satisfaction of SLOs (service level objectives) 340. The SLOs 340 include one or more performance levels, e.g. gold, silver and bronze, that indicate demands for quality of service measured in terms of response time. In particular, an SLO level may be specified for a production volume or a SG of multiple production volumes. For example, the gold level SLO for production volume 300 in SG 304 may indicate an IO response time of no greater than 5 ms in order to enable the host application 110 to provide a target level of performance or user experience. The response time for an SG is function of multiple factors including but not limited to data activity, composition (e.g. per data pool capacity), capacity utilization of data pools, and % utilization of data pools. The compositions of the SRP 302 and SGs may be selected to help satisfy the SLOs. For example and without limitation, SG 304 may have a proportionally greater allocation of tier 0 data pool 316 storage resources than SG 306 based on the difference in expected response times between the gold and silver SLO levels.

Figure 4:
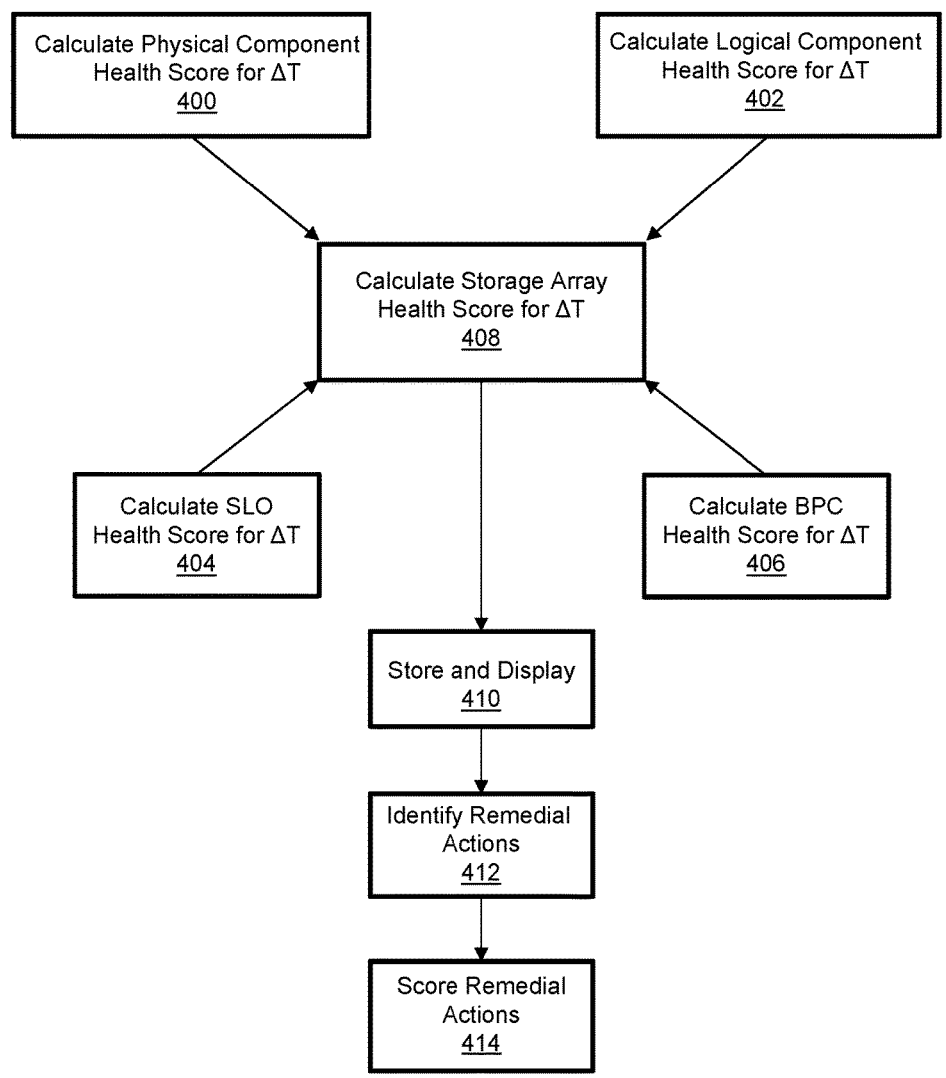
FIG. 4 illustrates calculation and use of a storage array health score.

FIG. 4 illustrates calculation and use of the storage array health score. The storage array health score is calculated based on four component values: physical component health score, logical component health score, SLO health score and BPC (best practice configuration) health score. In the illustrated example the physical component health score for a time period $\Delta T$ (e.g. and without limitation 15 minutes) is calculated at block 400. The logical component health score for the time period $\Delta T$ is calculated at block 402. The SLO health score for the time period $\Delta T$ is calculated at block 404. The BPC health score for the time period $\Delta T$ is calculated at block 406. Each of the component health scores calculated in blocks 400, 402, 404 and 406 may be a single numerical value from 0 to 100, e.g. where 100 indicates perfect health for the associated component and 0 indicates least perfect health. The storage array health score for the time period $\Delta T$ is calculated at block 408. The storage array health score may be calculated by averaging the component health scores. The component health scores may be, but are not necessarily, weighted. The storage array health score for the time period $\Delta T$ may be stored and displayed as indicated in block 410. For example, the health scores of one or more storage arrays over consecutive time periods may be presented on the dashboard interface 112 (FIG. 1). The storage array health scores and component health scores may be used to identify and score remedial actions as indicated in blocks 412 and 414, respectively. For example, a decrease in the storage array health score for storage array 102 (FIG. 1) may indicate a need for remedial actions. The component health scores may be used to localize the cause of the problem by identifying the component or components causing the storage array health score to be too low. The component health scores, KPIs (key performance indicators) and other information may be used to identify per-component remedial actions, e.g. and without limitation adding or replacing components such as computing nodes and storage devices. The remedial actions may be modeled and scored by recalculating the storage array health score based on changes to KPIs and other information anticipated as a result of the remedial action.

Figure 5:
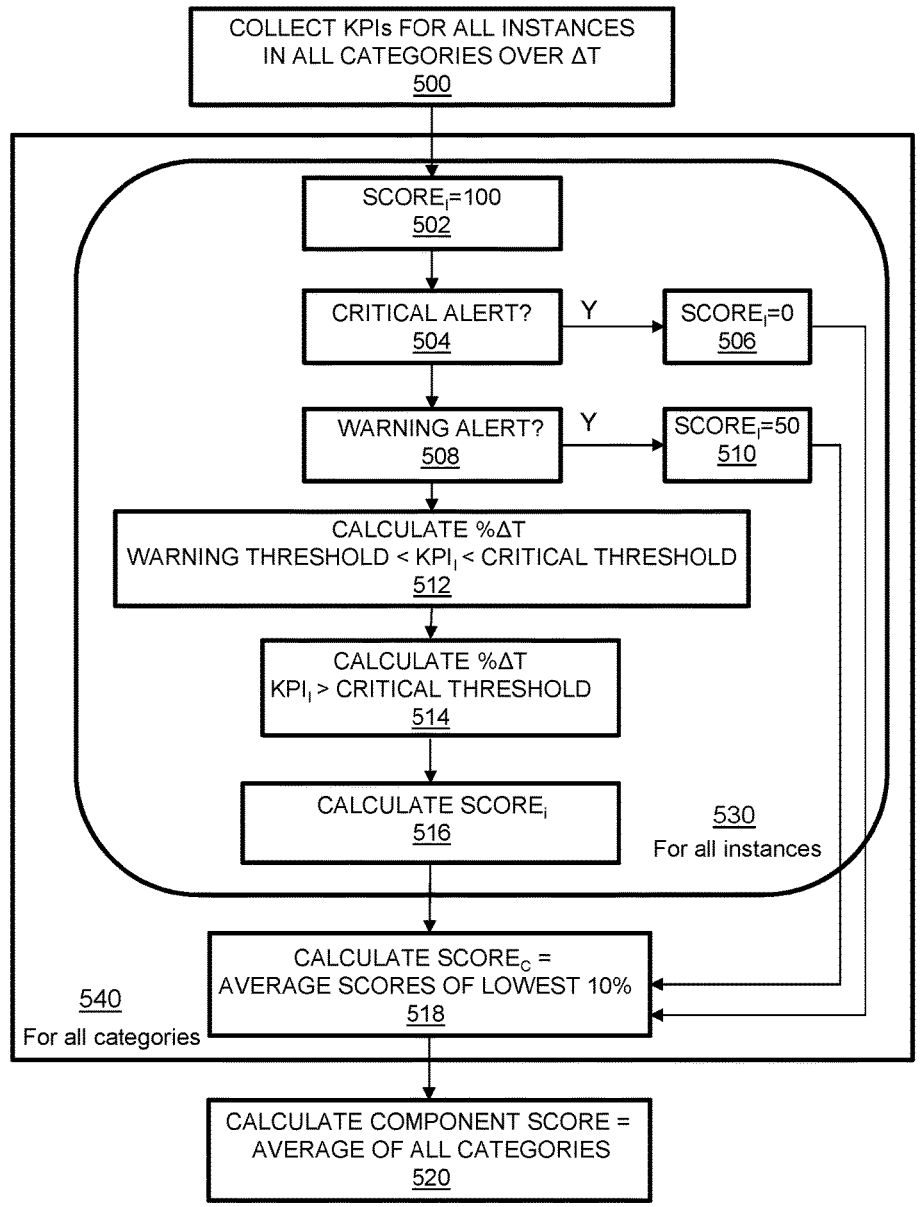
FIG. 5 illustrates calculation of the physical component and logical component health scores.

FIG. 5 illustrates calculation of the physical component and logical component health scores in greater detail. KPIs for all instances in all categories over the time period $\Delta T$ are collected as indicated in block 500. The categories for calculation of the physical component score may include but are not limited to: engines, computing nodes, FE ports, FE directors/adapters, BE ports, BE directors/adapters, CAs, CA ports, cache/cache partitions, tangible data storage devices, boards, and board-level subsystems. The KPIs for each physical component category may include utilization, e.g. expressed as a % relative to maximum capability. Queue depth may also be used as a KPI, e.g. in the case of FE directors. The categories for calculation of the logical component score may include but are not limited to: SGs and host applications. The KPIs for each logical component category may include response time. Broadly, a health score is calculated for each instance in a category for a particular component, the instance health scores are aggregated into a category health score, and the category health scores are aggregated into a component health score. Procedure 530 is implemented separately for each instance in the component category over $\Delta T$, e.g. for each SG instance in the case of calculation of the SG category health score to calculate the logical component health score. The score for the instance is initialized to a value of 100 in block 502. If a critical alert is detected during $\Delta T$ as determined in block 504 then the instance score is set to 0 in block 506. If a warning alert is detected during $\Delta T$ as determined in block 508 then the instance score is set to 50 in block 510. The alerts may be generated by the storage array in accordance with known techniques. In the absence of alerts the KPI values over $\Delta T$ for the instance are compared with warning and alert thresholds. For purposes of explanation it is assumed that an increasing KPI value corresponds to decreasing performance and health. For example, a high utilization % or high response time may correspond to decreasing performance and health. However, some KPIs may indicate decreasing performance and health via decreasing KPI values, and adjustments for processing of such values will be understood in view of this description. The % of $\Delta T$ during which the instance KPI was between the warning and critical thresholds (i.e., in a warning state) is calculated at block 512. The % of $\Delta T$ during which the instance KPI was greater than the critical threshold (i.e., in a critical state) is calculated at block 514. The calculated % values are used to calculate an instance health score in step 516. For example, the calculated % values may be weighted, summed and deducted from the initialized category-instance health score value 100. In a specific example with weights of 1 and 0.5 for the critical and warning states, respectively, if the instance KPI exceeded the critical threshold 10% of the time and was between the two thresholds for 30% of the time then the health score for that instance would be: $100-((10*1)+(30*0.5))=75$. If the instance KPI was below the warning threshold for 100% of $\Delta T$ then the instance health score would be $100=100-((0*1)+(0*0.5))$. Procedure 530 is implemented separately for each instance in the category being scored. Procedure 540 is implemented separately for all categories of the component being scored. In block 518 a category score is calculated as the average of the lowest 10% of the scores of all instances in the category, although the average of all instance scores or the minimum of all instance scores could be used. The component score is calculated as the average of all of the category scores of all of the categories of the component in block 520. Consequently, the logical component score may be the average of (1) the average of the lowest 10% of all of the SG instance scores and (2) the average of the lowest 10% of all of the host application instance scores.

Figure 6:
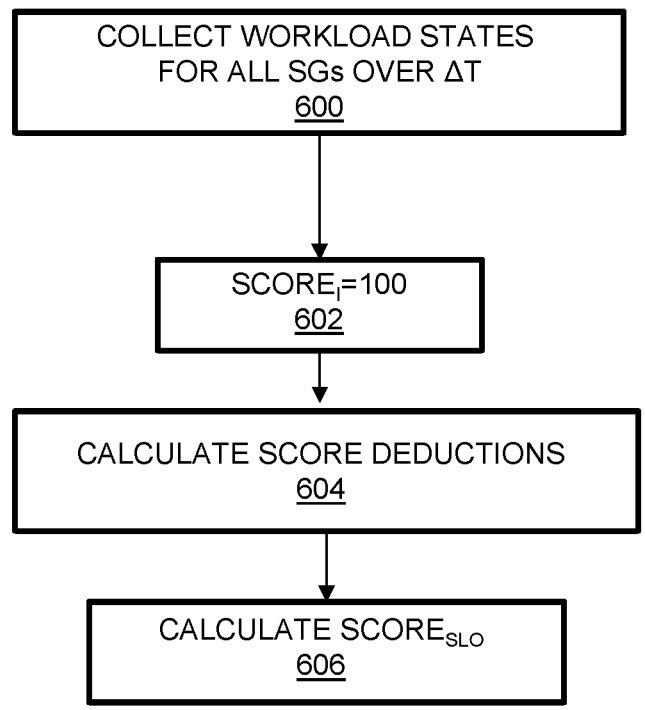
FIG. 6 illustrates calculation of the SLO (Service Level Objective) component health score.

FIG. 6 illustrates calculation of the SLO health score. The workload states of all SGs over $\Delta T$ are collected as indicated in block 600. Some SGs may not be associated with SLOs. Broadly, the workload states of SGs that are associated with SLOs may include underperforming, marginally performing and performing. Each SLO may include two types of performance-time goals, e.g. and without limitation a specified response time for a four-hour window and a two week window. If neither of the SLO performance-time goals are met then the SLO state is underperforming. If only one of the SLO performance-time goals is met then the SLO state is marginally performing. If both SLO performance-time goals are met then the SLO state is stable. The SG-SLO score is initialized to a value of 100 in block 602. Score deductions for the SG are calculated in block 604. In particular, a fully weighted deduction multiplier of 100 is applied to the fraction of SGs in the underperforming state and a partially weighted deduction multiplier of 50 is applied to the fraction of SGs in the marginally performing state. The SLO score is calculated in block 606 by summing the deductions and reducing the initialized score by the value of the summed deductions. For context and without limitation, if there are 50 total SGs and 40 of the 50 SGs are associated with SLOs, and 25 of the 40 SGs associated with SLOs are in an underperforming state, and 10 of the 40 SGs are in a marginally performing state, the SLO health score calculation would be:

$$100-(((25/40)*100)+((10/40)*50)))=25$$

Figure 7:
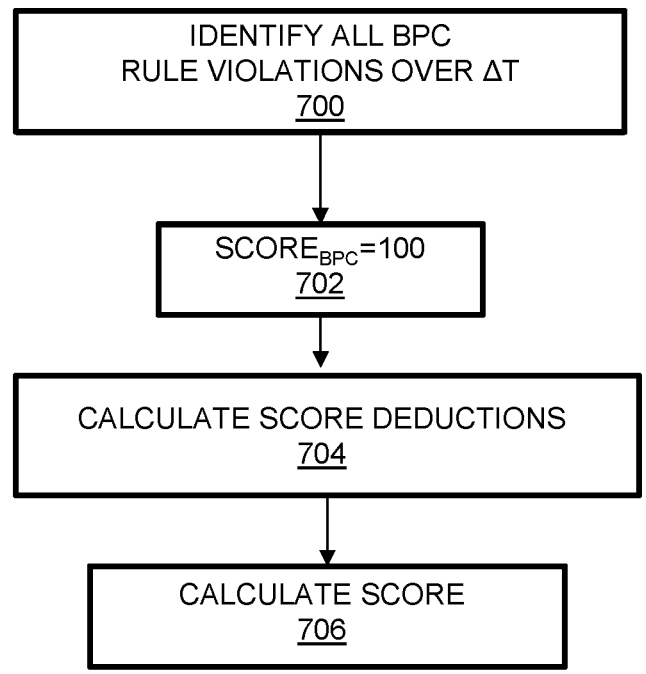
FIG. 7 illustrates calculation of the BPC (Best Practice Configuration) component health score.

FIG. 7 illustrates calculation of the BPC component health score. All BPC rule violations occurring over $\Delta T$ are identified in block 700. BPC rules may include but are not limited to: equivalent cache size across all engines; equivalent numbers of FEs across all engines; having X % of total storage capacity as SSD storage capacity; minimum capacity of individual SSDs; minimum of one RAID group per board; RAID-1—two per computing node (4 drives per engine); RAID-5 (3+1)—four per computing node (8 drives per engine); RAID-5 (7+1)—eight per computing node (16 drives per engine); engine capacity; variety of drive types; drive types with RAID levels; number of ports; and mix of components. Each BPC rule may be associated with a score deduction or range of score deductions. The score is initialized to a value of 100 in step 702. Score deductions are calculated in block 704. For example, the deductions associated with all rule violations occurring over $\Delta T$ may be summed. The initialized score is adjusted by the deductions in block 706. More particularly, the initialized score of 100 is reduced by the sum of the deductions to yield the BPC component score.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
a data storage system comprising a plurality of storage arrays, each storage array comprising a plurality of tangible data storage devices and a plurality of computing nodes, each computing node comprising at least one processor and a cache, wherein the computing nodes present at least one production volume to a host application, the production volume being backed by the tangible data storage devices, the tangible data storage devices being organized as a storage resource pool, and resources of the storage resource pool being organized as a plurality of storage groups; and
program code stored on a non-transitory computer-readable memory, the program code comprising instructions that calculate a single value health score for each of the storage arrays as a function of a logical component score comprising a score for each storage group.

2. The apparatus of claim 1 comprising instructions that calculate each storage array health score as a function of a physical component score and the logical component score.

3. The apparatus of claim 2 comprising instructions that calculate the physical component score as a function of a plurality of physical component category scores.

4. The apparatus of claim 3 comprising instructions that calculate each physical component category score as a function of a plurality of physical component category instance scores.

5. The apparatus of claim 4 comprising records of performance indicators in a plurality of physical component categories selected from storage engines, computing nodes, front end ports, front end directors, back end ports, back end directors, channel adapters, channel adapter ports, cache, cache partitions, tangible data storage devices, boards, and board-level subsystems.

6. The apparatus of claim 2 comprising instructions that calculate the logical component score as a function of a plurality of logical component category scores.

7. The apparatus of claim 6 comprising instruction that calculate each logical component category score as a function of a plurality of logical component category instance scores.

8. The apparatus of claim 7 comprising records of performance indicators in a logical component category selected from storage groups and host applications.

9. The apparatus of claim 2 comprising the instructions further utilizing a service level obligation compliance component score to calculate each storage array health score.

10. The apparatus of claim 9 comprising the instructions further utilizing a best practices compliance component score to calculate each storage array health score.

11. A method comprising:
with a data storage system comprising a plurality of storage arrays, each storage array comprising a plurality of tangible data storage devices and a plurality of computing nodes, each computing node comprising at least one processor and a cache:
presenting at least one production volume to a host application, the production volume being backed by the tangible data storage devices, the tangible data storage devices being organized as a storage resource pool, and resources of the storage resource pool being organized as a plurality of storage groups; and
calculating a single value health score for each of the storage arrays as a function of a logical component score comprising a score for each storage group.

12. The method of claim 11 comprising calculating each storage array health score as a function of a physical component score and the logical component score.

13. The method of claim 12 comprising calculating the physical component score as a function of a plurality of physical component category scores.

14. The method of claim 13 comprising calculating each physical component category score as a function of a plurality of physical component category instance scores.

15. The method of claim 14 comprising calculating physical component instance scores based on records of performance indicators in a plurality of physical component categories selected from storage engines, computing nodes, front end ports, front end directors, back end ports, back end directors, channel adapters, channel adapter ports, cache, cache partitions, tangible data storage devices, boards, and board-level subsystems.

16. The method of claim 12 comprising calculating the logical component score as a function of a plurality of logical component category scores.

17. The method of claim 16 comprising calculating each logical component category score as a function of a plurality of logical component category instance scores.

18. The method of claim 17 comprising calculating logical component instance scores based on records of performance indicators in a logical component category selected from storage groups and host applications.

19. The method of claim 12 comprising utilizing a service level obligation compliance component score to calculate each storage array health score.

20. The method of claim 19 comprising utilizing a best practices compliance component score to calculate each storage array health score.

* * * * *